(12) United States Patent
Kim et al.

(10) Patent No.: US 11,527,000 B2
(45) Date of Patent: Dec. 13, 2022

(54) SYSTEM AND METHOD FOR RE-IDENTIFYING TARGET OBJECT BASED ON LOCATION INFORMATION OF CCTV AND MOVEMENT INFORMATION OF OBJECT

(71) Applicant: KOREA INSTITUTE OF SCIENCE AND TECHNOLOGY, Seoul (KR)

(72) Inventors: Ig Jae Kim, Seoul (KR); Heeseung Choi, Seoul (KR); Haksub Kim, Seoul (KR); Seungho Chae, Seoul (KR); Yoonsik Yang, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 149 days.

(21) Appl. No.: 17/038,093

(22) Filed: Sep. 30, 2020

(65) Prior Publication Data

US 2021/0225013 A1 Jul. 22, 2021

(30) Foreign Application Priority Data

Jan. 22, 2020 (KR) .......................... 10-2020-0008442

(51) Int. Cl.
*G06T 7/292* (2017.01)
*G06T 7/70* (2017.01)
(Continued)

(52) U.S. Cl.
CPC ................ *G06T 7/292* (2017.01); *G06T 7/70* (2017.01); *G06V 10/751* (2022.01); *G06V 20/46* (2022.01); *G06V 20/52* (2022.01); *G06V 40/10* (2022.01); *H04N 7/181* (2013.01); *G06T 2207/10016* (2013.01); *G06T 2207/30168* (2013.01); *G06T 2207/30196* (2013.01); *G06T 2207/30232* (2013.01)

(58) Field of Classification Search
None
See application file for complete search history.

(56) References Cited

U.S. PATENT DOCUMENTS

2020/0184230 A1* 6/2020 Liu ........................ G06V 20/52

FOREIGN PATENT DOCUMENTS

| KR | 101142933 B1 | 5/2012 |
| KR | 101498985 B1 | 3/2015 |

(Continued)

*Primary Examiner* — James M Anderson, II
(74) *Attorney, Agent, or Firm* — Cantor Colburn LLP

(57) ABSTRACT

Embodiments relate to a method for re-identifying a target object based on location information of closed-circuit television (CCTV) and movement information of the target object and a system for performing the same, the method including detecting at least one object of interest in a plurality of source videos based on a preset condition of the object of interest, tracking the identified object of interest on the corresponding source video to generate a tube of the object of interest, receiving an image query including a target patch and location information of the CCTV, determining at least one search candidate area based on the location information of the CCTV and the movement information of the target object, re-identifying if the object of interest seen in the tube of the object of interest is the target object, and providing a user with the tube of the re-identified object of interest.

17 Claims, 11 Drawing Sheets

(51) Int. Cl.
*H04N 7/18* (2006.01)
*G06V 10/75* (2022.01)
*G06V 20/40* (2022.01)
*G06V 20/52* (2022.01)
*G06V 40/10* (2022.01)

(56) References Cited

FOREIGN PATENT DOCUMENTS

| | | | |
|---|---|---|---|
| KR | 101850286 B1 | 4/2018 | |
| KR | 101942808 B1 | 1/2019 | |
| KR | 10-2019-0068000 A | 6/2019 | |
| KR | 2019068000 A * | 6/2019 | ......... G06K 9/00369 |
| KR | 1020190121947 A | 10/2019 | |
| KR | 102147100 B1 | 8/2020 | |

* cited by examiner

Patch recovery result (Recovered patch in outline)

SYSTEM AND METHOD FOR RE-IDENTIFYING TARGET OBJECT BASED ON LOCATION INFORMATION OF CCTV AND MOVEMENT INFORMATION OF OBJECT

CROSS-REFERENCE TO RELATED APPLICATION

This application claims priority to Korean Patent Application No. 10-2020-0008442, filed on Jan. 22, 2020, and all the benefits accruing therefrom under 35 U.S.C. § 119, the contents of which in its entirety are herein incorporated by reference.

TECHNICAL FIELD

Embodiments of the present disclosure relate to searching for an image or a video of a user's desired target object, and more particularly, to a system and method that identifies an object of interest which is a candidate of a target object to generate a tube of the object of interest, and in order to search for an image or a video of the target object, re-identifies the target object in a tube of a search candidate area in which the target object is highly likely to be additionally detected.

DESCRIPTION ABOUT NATIONAL RESEARCH AND DEVELOPMENT SUPPORT

This study was supported by the National Research Foundation of Korea (Project Name. Development of complex cognitive technology for identification of missing children, Project No. 1711094167) under the superintendence of Ministry of Science, ICT and Future Planning, Republic of Korea.

BACKGROUND ART

Recently, with the growing public interest in security/safety, the number of closed-circuit television (CCTV) cameras installed in the roads, streets and buildings is increasing sharply. Thus, the number of input images to be analyzed by the system is more than a few thousand to a few tens of thousands per second. It takes a lot of time to search for a user's desired target object in many input images.

Particularly, this system can preferentially acquire videos of a target object from CCTV cameras, for example, installed in the location at which a missing child was last seen or a crime occurred, but cannot search for the corresponding target object afterwards. In this process, when there are many objects having similar appearances, incorrect detection may increase.

Patent No. 10-1498985 titled "System for photographing and monitoring an emergency scene based on Global Positioning System (GPS) location information using Internet Protocol (IP) CCTV cameras and a method for photographing and monitoring an emergency scene using the same" estimates and monitors a user's location based on GPS through a specific application of a mobile device, thereby reducing the searching time. However, when the user does not have the mobile device, it is difficult to conduct a fast search.

DISCLOSURE

Technical Problem

According to an aspect of the present disclosure, there is provided a system for re-identifying a target object, in which the target object is identified in a tube of a search candidate area in which the target object is highly likely to be additionally detected based on location information of closed-circuit television (CCTV) cameras and movement information of the target object, to efficiently search for an image or a video of the target object.

In addition, there is provided a method for re-identifying a target object based on location information of CCTV and movement information of the target object and a computer-readable recording medium having recorded the method thereon.

Technical Solution

A method for re-identifying a target object based on location information of closed-circuit television (CCTV) and movement information of the target object according to an aspect of the present disclosure is performed by a computing device including a processor, and the method includes receiving a plurality of source videos captured in a plurality of areas, wherein the plurality of areas includes areas in which some of the plurality of CCTVs are installed, detecting at least one object of interest in the plurality of source videos based on a preset condition of the object of interest, tracking the detected object of interest on the corresponding source video to generate a tube of the object of interest, receiving an image query including a target patch in which a target object is seen, and location information of the CCTV having captured the target object, determining at least one search candidate area based on the location information of the CCTV having captured the target object and the movement information of the target object, re-identifying if the object of interest seen in the tube of the object of interest is the target object to search for the tube of the object of interest in which the target object is seen, and providing a user with the tube of the re-identified object of interest as a query result. Here, the tube of the object of interest, on which the re-identification is performed, is the tube of the object of interest generated by capturing at least part of the determined search candidate area. That is, the re-identification operation is performed on the tube of the object of interest related to the search candidate area.

In an embodiment, detecting the at least one object of interest may include detecting an object satisfying the condition of the object of interest including at least one of an object condition or an event condition in the plurality of source videos, and identifying the detected object as the object of interest, wherein the object condition includes an object type, and the event condition includes presence or absence of movement of the object.

In an embodiment, generating the tube of the at least one object of interest may include arranging a tracked frame including a patch of the object of interest tracked in a single source video in a time series manner, to generate the tube of the identified object of interest from the corresponding source video.

In an embodiment, generating the tube of the at least one object of interest may further include, when a tracking failed frame in which tracking of the object of interest failed in the corresponding source video is acquired, recovering the tracking failed frame based on a first tracked frame captured in an earlier time than the tracking failed frame and a second tracked frame captured in a later time than the tracking failed frame, and further arranging the corrected frames in a time series manner to generate the tube of the object of interest.

In an embodiment, recovering the tracking failed frame may include acquiring location information of the object of interest for which tracking failed on the tracking failed frame. Here, the location information of the object of interest on the tracking failed frame, acquired through the recovery of the tracking failed frame, may include at least one of a horizontal coordinate-vertical coordinate pair of the patch of the object of interest to be tracked, or a height-width pair of the patch of the object of interest. When the tracking failed frame is captured at t, the previous tracked frame is captured at t+a, and the subsequent tracked frame is captured at t+b, each of the horizontal coordinate ($x_t$) and the vertical coordinate ($y_t$) of the patch of the object of interest in the tracking failed frame may be calculated by the following Equation 1:

$$x_t = |x_{t+b} - x_{t+a}|((t+b)-(t+a))$$

$$y_t = |y_{t+b} - y_{t+a}|/((t+b)-(t+a))$$ [Equation 1]

Each of the height ($h_t$) and the width ($w_t$) of the patch of the object of interest in the tracking failed frame may be calculated by the following Equation 2:

$$w_t = |w_{t+b} - w_{t+a}|((t+b)-(t+a))$$

$$h_t = |h_{t+b} - h_{t+a}|((t+b)-(t+a))$$ [Equation 2]

where $x_{t+a}$, $y_{t+a}$, $w_{t+a}$, $h_{t+a}$ denote the horizontal coordinate, the vertical coordinate, the area and the depth of the patch of the object of interest tracked in the previous tracked frame respectively, and $x_{t+b}$, $y_{t+b}$, $w_{t+b}$, $h_{t+b}$ denote the horizontal coordinate, the vertical coordinate, the area and the depth of the patch of the object of interest tracked in the subsequent tracked frame respectively.

In an embodiment, generating the tube of the object of interest may include, when $1^{st}$ to $n^{th}$ source videos, in which a same first object of interest is seen in at least some frames, are received from $1^{st}$ to $n^{th}$ CCTVs installed in a same area respectively, wherein n is an integer of two or greater, tracking the first object of interest in the $1^{st}$ to $n^{th}$ source videos to generate n tubes of the object of interest including #1-1 tube of the object of interest and #1-n tube of the object of interest, and unifying the n tubes of the object of interest into the first object of interest.

In an embodiment, the unifying may include selecting at least one representative image for each of the n tubes of the object of interest in each tube, and unifying the n tubes of the object of interest by clustering the tubes based on attribute information of the selected representative image.

In an embodiment, the representative image of the tube may be a patch of at least part of a frame having a smallest change in direction of the object of interest in the tube, or a patch of at least part of a frame having a smallest change in speed of the object of interest in the tube.

In an embodiment, the representative image of the tube may be selected by calculating an image quality score for each of a plurality of patches of the object of interest included in the tube, and the image quality score may be calculated based on detection accuracy of the object of interest, a degree of occlusion of the object of interest, and a distance between the object of interest and the CCTV.

In an embodiment, determining the search candidate area may include determining at least one area as the search candidate area based on direction and speed of the target patch.

In an embodiment, determining the search candidate area may include determining the search candidate area by searching for a shortest path.

In an embodiment, the method may further include, before determining the search candidate area, when the tube of the object of interest from which the target patch is extracted is unified, calculating the movement information of the target object from at least part of the extracted tube and other unified tube.

In an embodiment, calculating the movement information of the target object from at least part of the extracted tube and other unified tube may include calculating the movement information of the target object in the extracted tube, and when the extracted tube has a non-consecutive frame, searching for a frame of a time corresponding to the non-consecutive frame in the other unified tube, and additionally calculating the movement information of the target object at the corresponding time based on the frame found in the other unified tube.

In an embodiment, re-identifying if the object of interest seen in the tube generated by capturing at least part of the determined search candidate area is the target object may include searching for a cluster that matches attribute information of the target patch at least in part, and re-identifying the target object in the tube of the object of interest included in the found cluster.

In an embodiment, searching for the matching cluster may include acquiring feature result information of the tube by applying at least part of the frame included in the tube of the object of interest and at least part of the tube of the target object to a re-identification model, determining the matching tube based on comparison between the feature result information of the tube, and searching for the cluster including the determined matching tube.

In an embodiment, a class of the target object may be a human, and the re-identification model may be configured to detect a body part in a human image seen in a target patch or a patch of the object of interest, calculate skeleton information and body-part information, extract global features from reconstruction information of the skeleton and the body-part in combination, extract features per part from each of the skeleton information and the body-part information, and output the feature result information of the tube by concatenation of the global features and the features per part.

A computer-readable recording medium according to another aspect of the present disclosure stores program instructions that can be executed by a computing device. Here, when the program instructions are executed by a processor of the computing device, the processor performs the method for re-identifying a target object based on location information of CCTV and movement information of the target object according to the above-described embodiments.

A system for re-identifying a target object based on location information of CCTV and movement information of the target object according to still another aspect of the present disclosure includes a plurality of CCTVs to capture an object and a background, wherein the plurality of CCTVs is distributed in a plurality of areas and at least one CCTV is installed in each area, and a server configured to perform an image processing operation, and in response to a user's request for provision of an image, provide the requested image. Here, the server is configured to receive a plurality of source videos captured in the plurality of areas from the plurality of CCTVs, detect at least one object of interest in the plurality of source videos based on a preset condition of the object of interest, track the detected object of interest on the corresponding source video to generate a tube of the object of interest, receive an image query including a target patch in which a target object is seen and location information of the CCTV having captured the target object, determine at least one search candidate area based on the location information of the CCTV having captured the target object and the movement information of the target object, re-identify if the object of interest seen in the tube of the object of interest generated by capturing at least part of the determined search candidate area is the target object to search for the tube of the object of interest in which the target object is seen, and provide the user with the tube of the re-identified object of interest as a query result.

Advantageous Effects

The re-identification system according to an aspect of the present disclosure can achieve efficient search by unification of tubes of the same object even in consecutive multi-shot images.

As a result, it is possible to search for a target object, for example, a missing child quickly to ensure prompt initial action to be taken.

The effects of the present disclosure are not limited to the above-mentioned effects, and other effects not mentioned herein will be clearly understood by those skilled in the art from the appended claims.

DESCRIPTION OF DRAWINGS

The following is a brief introduction to necessary drawings in the description of the embodiments to describe the technical solutions of the embodiments of the present disclosure or the existing technology more clearly. It should be understood that the accompanying drawings are for the purpose of describing the embodiments of the present disclosure and not intended to be limiting of the present disclosure. Additionally, for clarity of description, the accompanying drawings may show some modified elements such as exaggerated and omitted elements.

BEST MODE

The terminology used herein is for the purpose of describing particular embodiments and not intended to be limiting of the present disclosure. Unless the context clearly indicates otherwise, the singular forms as used herein include the plural forms as well. The term "comprises" or "includes" when used in this specification, specifies the presence of stated features, regions, integers, steps, operations, elements, and/or components, but does not preclude the presence or addition of one or more other features, regions, integers, steps, operations, elements and/or components.

Unless otherwise defined, all terms (including technical and scientific terms) used herein have the same meaning as commonly understood by those skilled in the art. It is further understood that terms, such as those defined in commonly used dictionaries, should be interpreted as having a meaning that is consistent with their meaning in the context of the relevant art document and the present disclosure, and will not be interpreted in an idealized or overly formal sense unless expressly so defined herein.

Hereinafter, the embodiments of the present disclosure will be described in detail with reference to the accompanying drawings.

In the specification, a "tube" is a series of motion connected object sets, and refers to the concatenation of image parts representing objects or activities over the frames of a video. Preferably, a tube refers to a sequence of images appearing over the consecutive frames of a video. However, the tube is not necessarily limited to a tube including only consecutive frames, and a series of non-consecutive frames not including consecutive frames for a certain period of time may be referred to as the tube. As an object having an event is represented by the tube in the spatio-temporal volume, the terms "event object (or object of interest)" and "tube" may be interchangeably used in some cases below.

Figure 1:
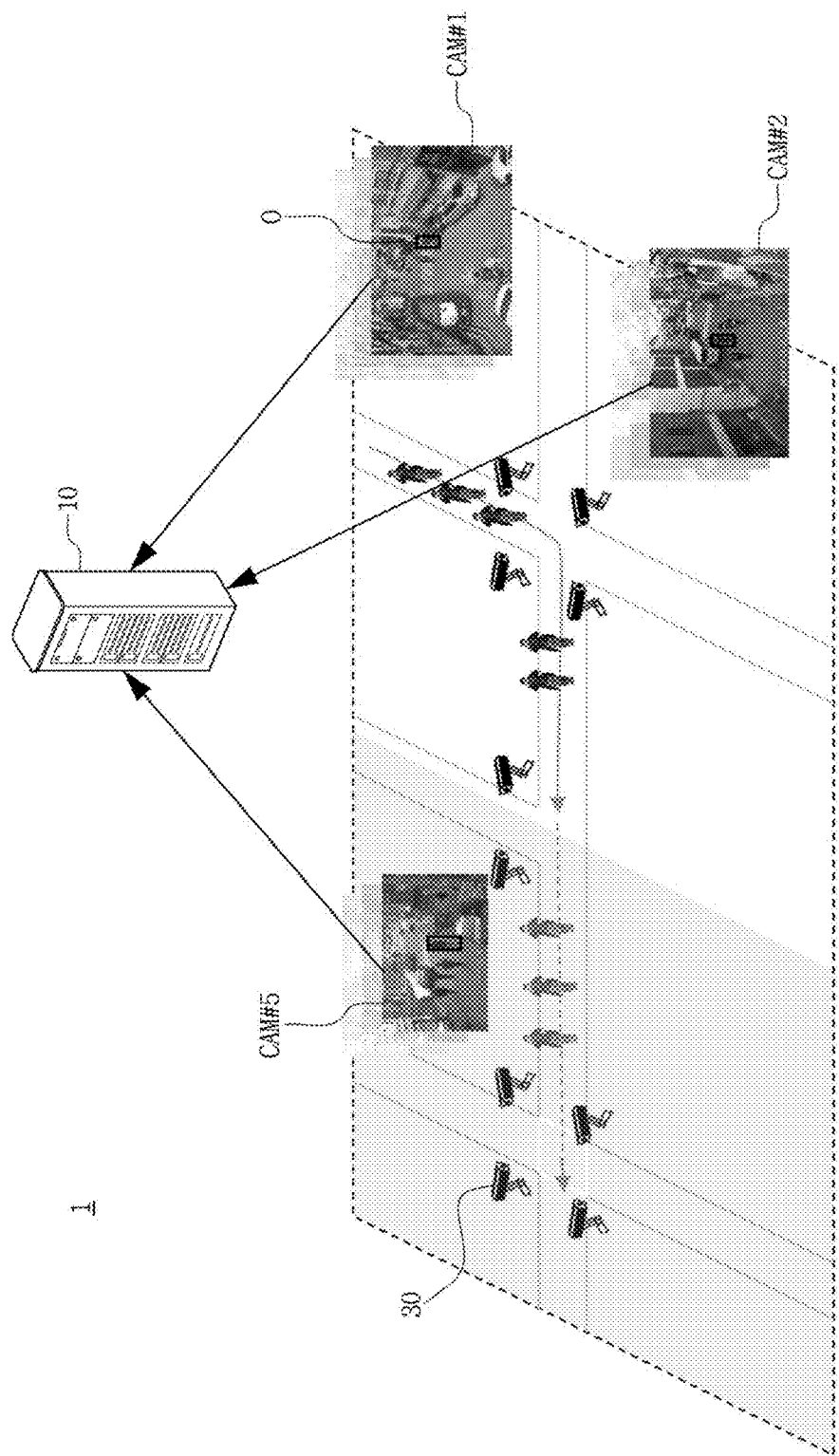
FIG. 1 is a conceptual diagram of a system for re-identifying a target object according to an embodiment of the present disclosure.

FIG. 1 is a conceptual diagram of a system for re-identifying a target object according to an embodiment of the present disclosure.

Referring to FIG. 1, the system 1 for re-identifying a target object based on location information of CCTV and movement information of the target object includes a server 10 to perform an operation of re-identifying the target object and a plurality of CCTVs 30 to provide an image and/or a video to the server 10, in order to search for the image (or the video) of the target object.

The system 1 for re-identifying a target object according to embodiments may have aspects of entirely hardware, entirely software, or partly hardware and partly software. For example, the system 1 for re-identifying a target object may refer collectively to hardware capable of processing data and software that manages the hardware. The term "unit", "module", "device" or "system" as used herein is intended to refer to a combination of hardware and software that runs by the corresponding hardware. For example, the hardware may be a computing device capable of data processing, including a Central Processing Unit (CPU), a Graphic Processing Unit (GPU) or other processor. Additionally, the software may refer to a process being executed, an object, executable, a thread of execution and a program.

The CCTV 30 is an imaging device configured to receive a physical signal and capture a situation in the coverage to generate a video (or an image). The video captured and generated by the CCTV 30 is referred to as a source video. The system 1 acquires a source video including an object and/or a background in the coverage by real-time imaging during the operation of the CCTV 30.

The plurality of CCTVs 30 is installed in a plurality of areas. The plurality of areas includes areas in which the plurality of CCTVs 30 is installed with their own independent view range for each CCTV 30, or areas in which the plurality of CCTVs 30 is installed sharing at least part of their view ranges so that the same object is captured by at least some of the plurality of CCTVs 30 in overlapping views. In FIG. 1, the areas in which the CCTVs 30 are installed include a first area in which four CCTVs are installed, a second area in which two CCTVs are installed, and a third area in which four CCTVs are installed. Additionally, as shown in FIG. 1, a first camera and a second camera may be installed in the first area to capture the same object O in overlapping views.

The plurality of CCTVs 30 is connected to the server 10 via a wired/wireless network to generate a plurality of source videos and provide the source videos to the server 10. The CCTV 30 is not limited to an analog CCTV, a digital CCTV, a fixed CCTV and a moveable CCTV, and may include a variety of types of imaging devices capable of acquiring image information in real time. For example, a smartphone, a black box, etc. may acts as the CCTV 30 of the present disclosure.

Additionally, the CCTV 30 is further configured to generate an image or a video and generate detailed information associated with the generated image or video (for example, the source video). The detailed information includes identification information (for example, an identifier) of the CCTV 30 having captured the source video, location information of the CCTV 30, a timecode of the source video and/or identification information of the source video. For example, when the CCTV 30 captures a situation in the coverage to generate a source video, a plurality of frames of the source video, and detailed information including an identifier of the corresponding CCTV 30, a frame identifier and a timecode are acquired. When the related source video is transmitted, the detailed information is transmitted together, and unless the context clearly indicates otherwise, the present disclosure is not intended to exclude the transmission of the related detailed information from the operation of transmitting the source video to other component.

The server 10 is a plurality of computer systems or computer software implemented as a network server, and is configured to receive the image (for example, the source video) generated by the plurality of CCTVs 30 via the wired/wireless network. Here, the network server refers to a computer system and computer software (a network server program) connected to a low-level device capable of communicating with other network server via a computer network such as private Intranet or Internet to receive a task request, perform the task and provide the result. However, the network server should be understood in a broad concept including the network server program as well as a series of application programs running on the network server, and in some cases, a variety of types of databases built inside.

Before receiving the user's request (hereinafter, an image query) for provision of image information of the target object, the server 10 detects and stores an object of interest that is highly likely to be included in the target object in response to the user's request for search in the source video. An image including the stored object of interest includes a tube of the object of interest, and may be pre-stored in the system 1. To this end, the system 1 may further include a database (not shown) to store the detection result of the object of interest in the source video.

Then, when the server 10 receives the image query, the server 10 re-identifies if the target object is seen in part of the image including the detected (or stored) object of interest, thereby performing efficient search. The operation of the server 10 will be described in more detail with reference to FIGS. 2 to 10 below.

It will be obvious to those skilled in the art that the re-identification system 1 may include other components not described herein. For example, the re-identification system 1 may further include a data input device, an output device such as a display and/or a printer, a storage device such as memory, a network, a network interface and a protocol.

A method for re-identifying a target object based on location information of CCTV and movement information of the object according to another aspect of the present disclosure is performed by a computing device including a processor or a system including the same. Here, the computing device includes a computer and a server. Hereinafter, for clarity of description, the present disclosure will be described in more detail based on the embodiments in which the method is performed by the system of FIG. 1.

Figure 2:
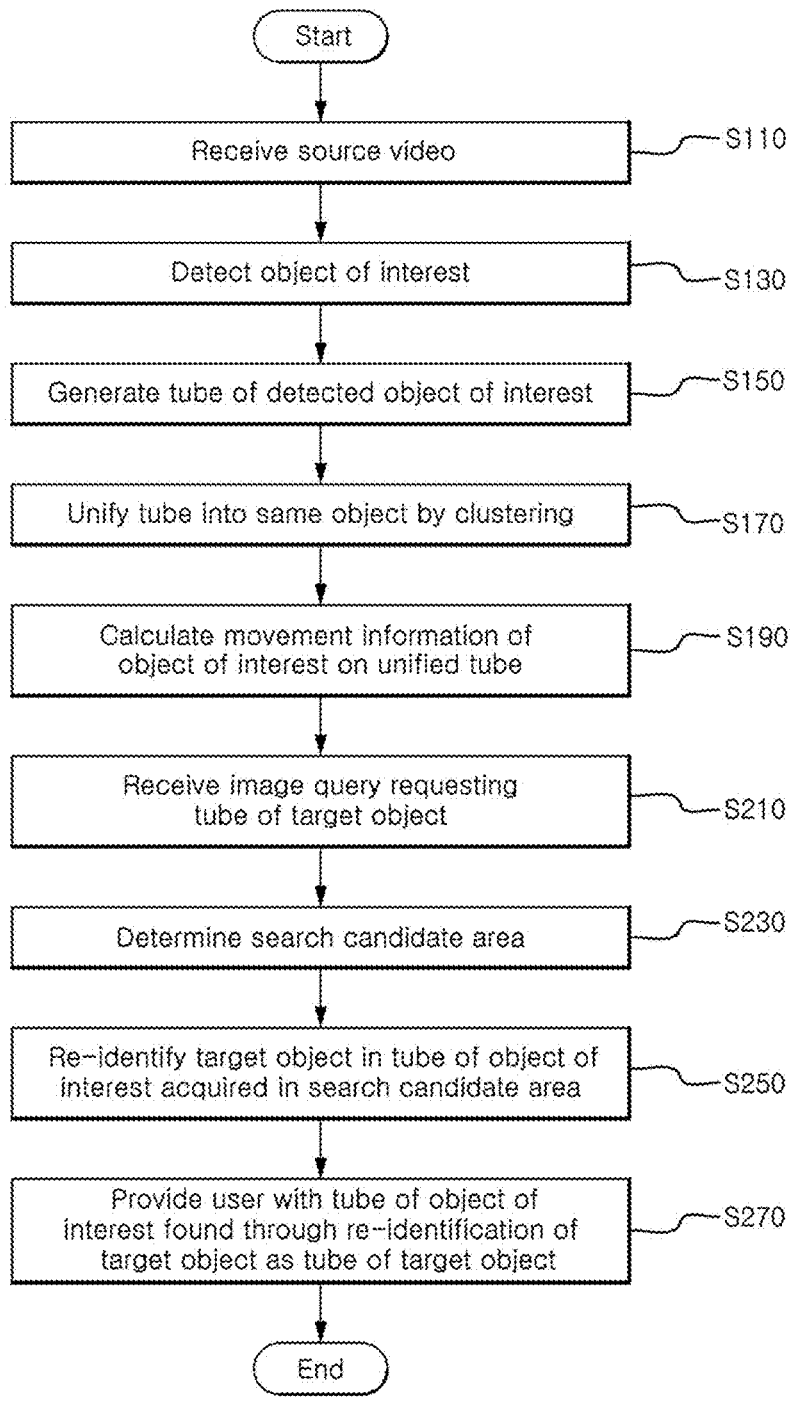
FIG. 2 is a flowchart of a method for re-identifying a target object according to an embodiment of the present disclosure.
Figure 3:
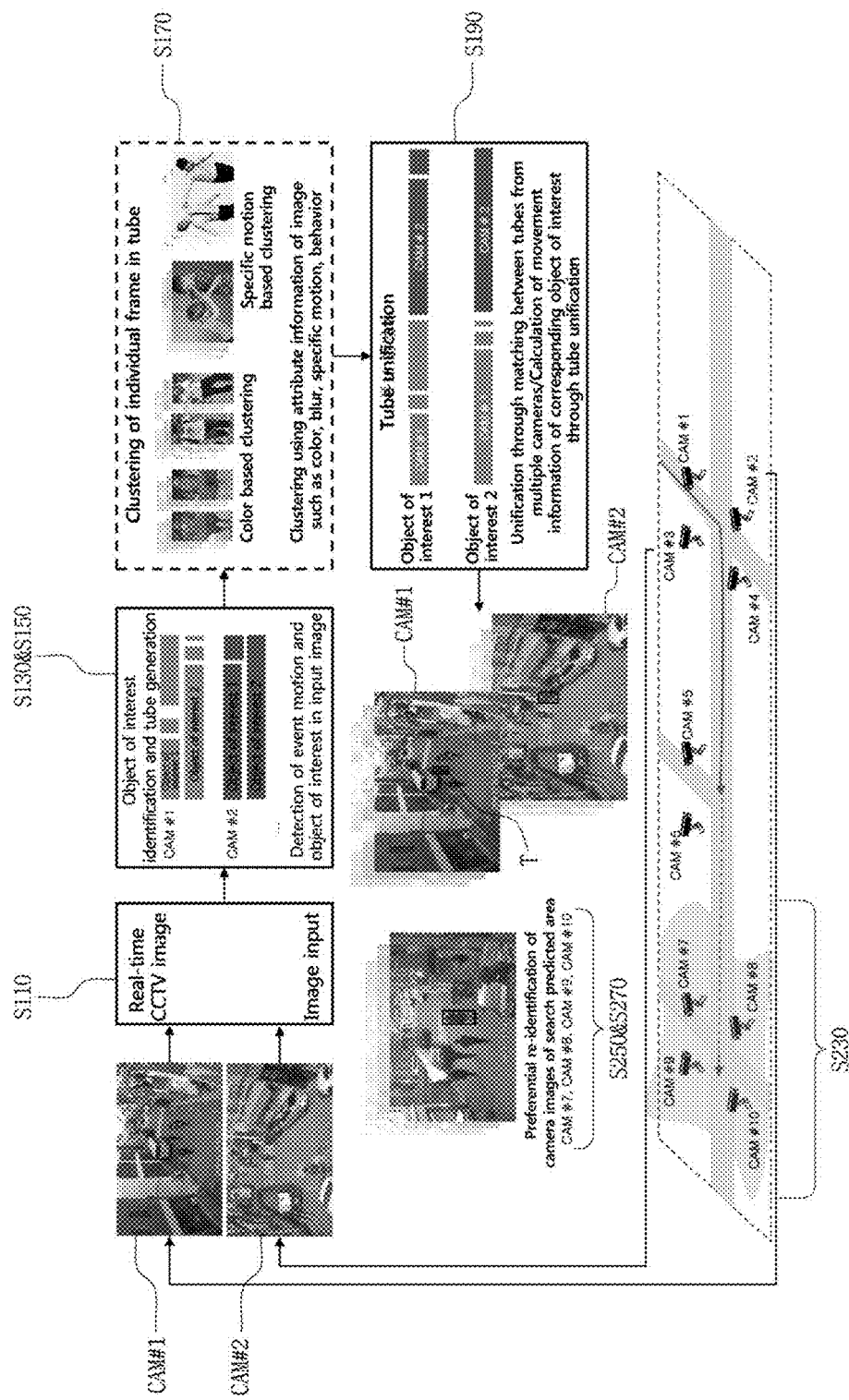
FIG. 3 is a conceptual diagram of the method of FIG. 2 performed by the system of FIG. 1.

FIG. 2 is a flowchart of the method for re-identifying a target object according to an embodiment of the present disclosure, and FIG. 3 is a conceptual diagram of the method of FIG. 2 performed by the system of FIG. 1.

Referring to FIGS. 2 and 3, the server 10 receives a plurality of source videos from the plurality of CCTVs 30 (S110).

The plurality of CCTVs 30 is installed in a plurality of areas. The CCTV 30 connected to the server 10 via wired/wireless communication has at least part of the area in which the CCTV 30 is installed as a view range. Each CCTV 30 captures a situation of the corresponding view range to generate a source video, and transmits the source video and related detailed information to the server 10 (S110).

In an embodiment, the plurality of areas includes areas in which the plurality of CCTVs 30 is independently installed, or areas in which some of the plurality of CCTVs 30 are installed sharing at least part of their view ranges. Some CCTVs 30 installed in the areas are two or more of the CCTVs 30. Then, for example, when an object moving in the corresponding area passes through the view range shared by the plurality of CCTVs 30, a plurality of source videos in which the object is seen is acquired. That is, the object is captured by the plurality of CCTVs 30 in overlapping views.

The server 10 detects at least one object of interest in the plurality of source videos received in the step S110 based on a preset condition of the object of interest (S130). Additionally, in the step S130, the detected object of interest that is not yet distinguished by an identifier (for example, ID) may be identified so that the detected object of interest may be distinguished by the identifier.

Before the step S130, the system 1 sets the condition of the object of interest. The object of interest is an object that is likely to be a target object for which the user wants to search. This setting operation is performed by the server 10 upon receiving the condition.

In the system 1, the condition of the object of interest may be freely set according to the nature of the system 1 and/or statistical results.

In an embodiment, the setting condition of the object of interest includes an event condition and/or an object condition.

The event condition includes a condition in which the user will be likely to get interested during searching and there is a change depending on the time and space for the same object. The event condition is, for example, the presence or absence of movement of the object. The movement includes motion made by a location change of the object on a sequence of consecutive frames and/or activity (action, pose) having little or no location change on the space in a sequence of consecutive frames.

The object condition includes a condition in which the user will be likely to get interested during searching and there is no change depending on the time and space for the same object. The object condition is set based on the purpose of the system and/or statistical results.

The object condition includes an object type that is the criterion for classifying the foreground first to identify the object. The object type includes a human or a vehicle. Here, the vehicle includes a vehicle such as a car and a truck, and a non-vehicle such as a motorcycle, a rear car, a bike, etc. That is, the object type corresponds to a class used to generally classify an object according to the type such as a human and a vehicle in the field of object recognition.

In some embodiments, the object condition may further include another condition according to the purpose of the system or the user. In this case, in addition to the presence or absence of the event and/or the object type, the server 10 detects an object further satisfying an additional condition as the object of interest.

The object condition may further include an object subtype as the criterion of detailed object type. For example, when a human is included in the type condition, the object condition may further include a human face as the object subtype.

The system 1 for re-identifying a target object identifies an object satisfying this condition as the object of interest (S130).

In an embodiment, the step S130 includes: detecting an object satisfying the condition of the object of interest in the plurality of source videos; and identifying the detected object as the object of interest. Here, the condition of the object of interest includes the event condition and/or the object condition described above.

The server 10 detects an object corresponding to the type included in the object condition through a variety of object detection techniques. The object detection technique includes, but is not limited to, for example, Haar, Convolution Neural Network (CNN), Scale Invariant Feature Transform (SIFT), Histogram of Gradients (HOG), Neural Network (NN), Support Vector Machine (SVM) and Gabor techniques, and may include a variety of object detection techniques capable of analyzing the object type.

The server 10 detects a moving object through a variety of movement detection techniques. The movement detection technique includes tracking-by-detection that detects an object included in the source video and tracks the detected object. Here, tracking is performed on a plurality of frames based on comparison of the detected object for each frame and/or energy distribution of the object in each frame.

In the process of detecting the object satisfying the object condition, the object type is analyzed, and in the detection process satisfying the event condition, the presence or absence of movement is analyzed, thereby identifying a minimum of objects in the source video.

Additionally, the server 10 may detect or identify the object in the video, and additionally set a region including at least part of the corresponding object. The region may be referred to as a Region of Interest (ROI), and may be set as the edge of the object of interest, or may be set to further include the object of interest and the surrounding background or foreground. The region of interest is seen in part of the entire video frame, and thus may be referred to as a patch. Thus, detection of the object of interest corresponds to detection of the region of interest.

After the step S130, the server 10 generates a tube of the object of interest by tracking the detected object of interest on the corresponding source video (S150). The tube includes a sequence of at least some patches of the object of interest connected in chronological order, and the corresponding source video is a source video in which the identified object of interest is seen.

The image (for example, the patch of the object of interest, or the frame of the source video including the patch of the object of interest) used to generate the tube of the object of interest includes an image directly acquired from the result of performing the previous steps S110 and S130, or an image indirectly acquired from the result of performing the previous steps S110 and S130 such as an image stored in the database before the step S150.

In an embodiment, the step S150 includes: arranging the tracked frame including the patch of the object of interest, acquired by tracking in one source video, in a time series manner, to generate the tube of the identified object of interest from the corresponding source video. Additionally, the step S150 includes: arranging the tracked frame including the patch of the object of interest of each of two or more source videos, acquired by tracking in each source video, in a time series manner, to generate the tube of the identified object of interest from the two or more source videos.

The tracked frame including the patch of the object of interest may be an image including the patch of the object of interest, extracted from the individual frame of the source video. The size or resolution of the image may be smaller than that of the individual frame of the source video.

Alternatively, the tracked frame including the patch of the object of interest may be an image in which the patch area of the object of interest is displayed on the individual frame, for example, the object O is displayed in the frame from the first camera shown in FIG. 1. The size or resolution of the image is the same as that of the individual frame of the source video.

When the tube of the object of interest based on the former is generated, a video including only the patch of the object of interest may be acquired. When the tube of the object of interest based on the latter is generated, a video in which the patch area is displayed over the entire frame may be acquired.

In the step S150, the object of interest is tracked over some frames in the corresponding source video, but the object of interest may not be tracked over some other frames. Some other frames are referred to as a tracking failed frame.

Tracking failure occurs based on a variety of causes. For example, when the object of interest being tracked temporarily moves out of the coverage of the CCTV 30 having captured the source video and goes back, or the object of interest being tracked collides with a different object on the time and space, the object of interest being tracked on the source video may not be actually seen at the time of the tracking failed frame.

Figure 5:
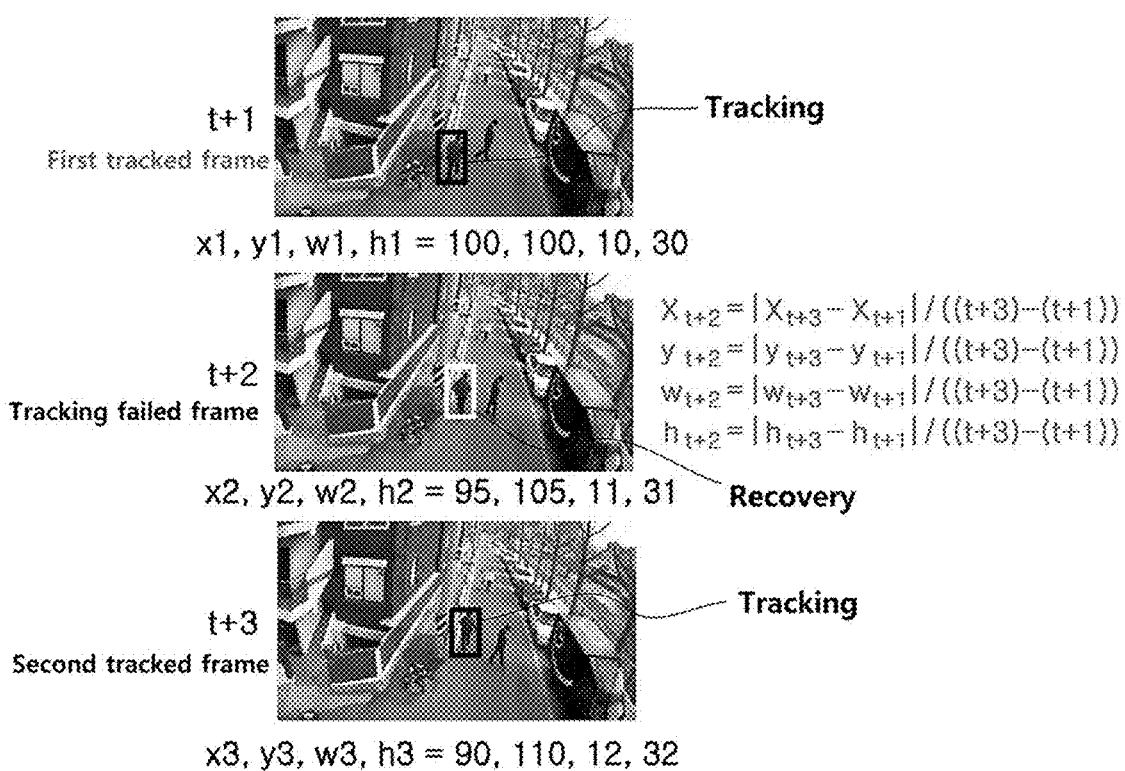

Even though the object of interest actually exists in the view range and the image of the object of interest is included in the tracking failed frame, when tracking of the corresponding object of interest in the tracking failed frame fails, tracking failure may occur. For example, as shown in FIG. 5, when a similar object is close to the object of interest, an error may occur in the identification operation of the object of interest.

When the tube having the tracking failed frame is generated, a non-consecutive video is generated in which there is no frame of the source video at the time of the tracking failed frame.

Referring back to FIG. 3, when a first object of interest is captured by the first and second CCTVs 30, the first object of interest is identified (S130) and tracked in #1-1 source video in which the first object of interest is captured by the first CCTV 30 to generate #1-1 tube (S150), and the first object of interest is identified (S130) and tracked in #1-2 source video in which the first object of interest is captured by the second CCTV 30 to generate #1-2 tube (S150). Additionally, when the second object of interest is captured by each of the first and second CCTVs 30, the second object of interest is identified (S130) and tracked in #2-1 source video in which the second object of interest is captured by the first CCTV 30 to generate #2-1 tube (S150), and the second object of interest is identified (S130) and tracked in #2-2 source video in which the second object of interest is captured by the second CCTV 30 to generate #2-2 tube (S150). As shown in FIG. 3, the #1-1 tube includes three sub tubes with a tracking failed frame interposed between two periods of time, the #1-2 tube includes two sub tubes having a tracking failed frame at one time point in the latter half of the period of time. In contrast, the #2-1 tube includes three sub tubes having tracking failed frames at two time points in the latter half of the period of time, and the #2-2 tube includes only the tracked frame without a tracking failed frame.

Additionally, when the tracking failed frame is included in the tube generated in the step S150, the server 10 is further configured to correct the tracking failed frame. In the step S150, the tube of the object of interest further including the frame at the time point when tracking failed is generated (S150).

Figure 4:
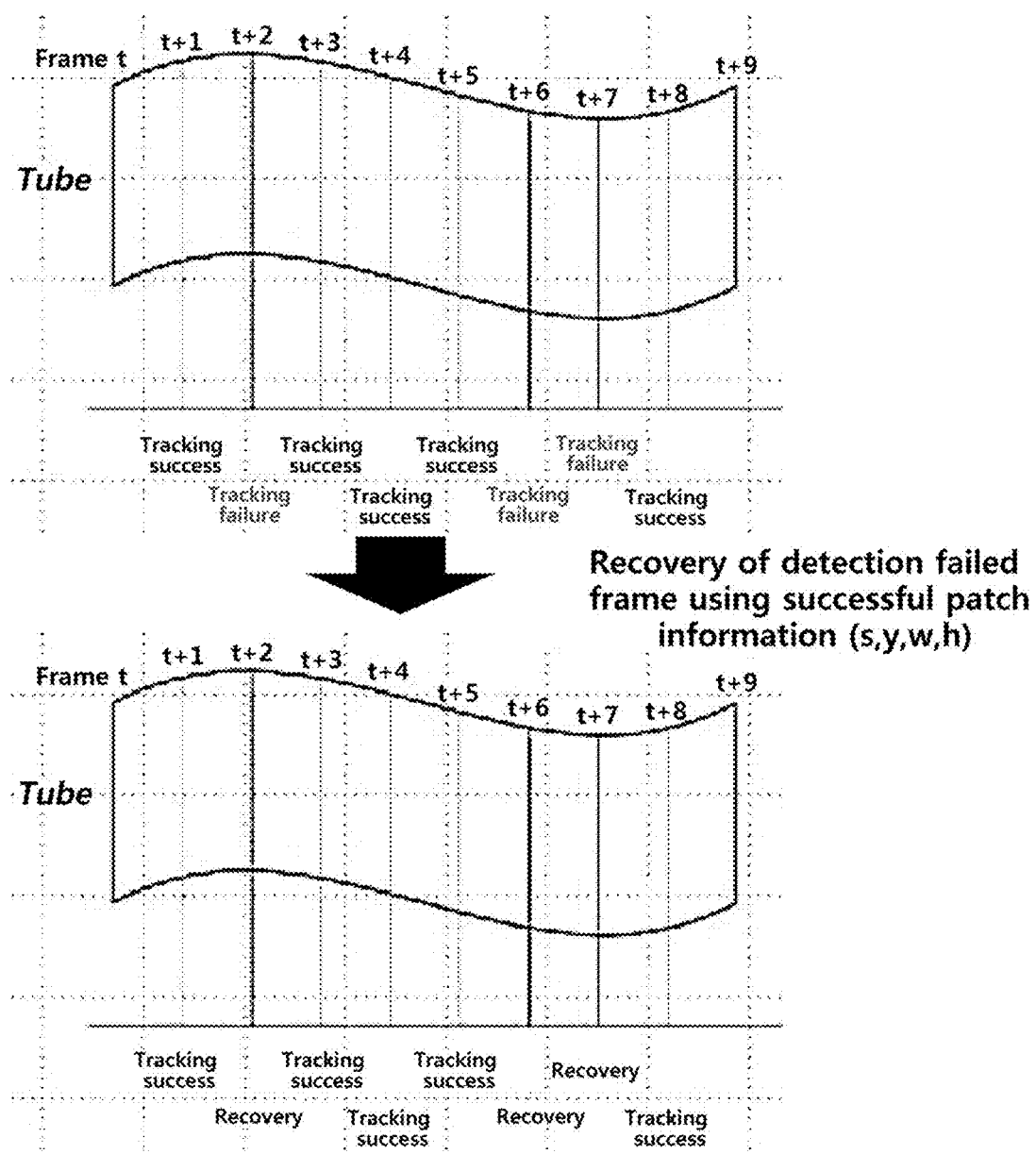
FIGS. 4 and 5 are diagrams illustrating the recovery of a tracking failed frame according to an embodiment of the present disclosure.

FIGS. 4 and 5 are diagrams illustrating the recovery of the tracking failed frame according to an embodiment of the present disclosure.

FIG. 4 shows the tube of the object of interest to be generated after the object of interest is tracked in at least part of the time range between t and t+9 when the first tracking time is t and the last tracking time is t+9. Here, the time of the frame indicates the time captured in the source video.

After the server 10 tracks the object of interest in the source video, in an example in which the successfully tracked frame (t+1, t+3) and the tracking failed frame (t+2, t+6, t+7) are acquired as shown in FIG. 4, when there is no recovery operation, in the step S150, the tube of the object of interest having frames captured at t+2, t+6, t+7 as the tracking failed frame is generated.

In an embodiment, the step S150 includes: further arranging the corrected frames in a time series manner to generate the tube of the object of interest. To this end, when the tracking failed frame in which tracking of the object of interest failed is acquired in the corresponding source video, the server 10 recovers the tracking failed frame based on the tracked frame captured before the time of the tracking failed frame and the tracked frame captured after the time of the tracking failed frame.

Referring to FIG. 4, to recover the first tracking failed frame captured at t+2, the server 10 recovers the first tracking failed frame based on the tracked frame (for example, #t+1 tracked frame) captured before the first tracking failed frame and the tracked frame (for example, #t+3 tracked frame) captured after the first tracking failed frame.

In an embodiment, the recovery of the tracking failed frame is to acquire location information of the object of interest of which tracking failed on the tracking failed frame. The location information of the object of interest on the tracking failed frame acquired through recovery of the tracking failed frame may include at least one of a horizontal coordinate-vertical coordinate pair of the patch of the object of interest to be tracked, or a height-width pair of the patch of the object of interest.

When the tracking failed frame to be recovered is captured at t, and the previous and subsequent tracked frames used to recover the tracking failed frame are captured at t+a and t+b respectively (captured in an order of t+a, t, t+b), each of the horizontal coordinate $x_t$ and the vertical coordinate $y_t$ of the patch of the object of interest in the tracking failed frame is calculated by the following Equation 1 and/or each of the height $h_t$ and the width $w_t$ of the patch of the object of interest in the tracking failed frame is calculated by the following Equation 2.

$$x_t = |x_{t+b} - x_{t+a}| / ((t+b) - (t+a))$$

$$y_t = |y_{t+b} - y_{t+a}| / ((t+b) - (t+a)) \quad \text{[Equation 1]}$$

$$w_t = |w_{t+b} - w_{t+a}| / ((t+b) - (t+a))$$

$$h_t = |h_{t+b} - h_{t+a}| / ((t+b) - (t+a)) \quad \text{[Equation 2]}$$

Here, $x_{t+a}$, $y_{t+a}$, $w_{t+a}$, $h_{t+a}$ denote the horizontal coordinate, the vertical coordinate, the area and the depth of the patch of the object of interest tracked in the previous tracked frame respectively, and $x_{t+b}$, $y_{t+b}$, $w_{t+b}$, $h_{t+b}$ denote the horizontal coordinate, the vertical coordinate, the area and the depth of the patch of the object of interest tracked in the subsequent tracked frame respectively. $x_t$, $y_t$, $w_t$, $h_t$ are location information of the recovered patch in the failed frame using information of the previous and subsequent tracked frames. When a plurality of consecutive frames by the unit of capture time is the tracking failed frame, $x_t$, $y_t$, $w_t$, $h_t$ are expressed as a variation based on a change from the previous time t+a to the subsequent time t+b on the basis of $x_{t+a}$, $y_{t+a}$, $w_{t+a}$, $h_{t+a}$.

As shown in FIG. 5, when tracking of the object of interest succeeds in the frames captured at t+1 and t+3 but tracking of the object of interest fails in the frame captured at t+2, location information ($x_2=95$; $y_2=105$; $w_2=11$, $h_2=31$) of the object of interest on the first tracking failed frame captured at t+2 is acquired using the above Equations 1 and 2.

In some embodiments, the tracking failed frame to be recovered may be captured in the middle time between the time the previous tracked frame and the time of subsequent tracked frame.

Through the above-described process, the server 10 may recover the second and third tracking failed frames of FIG. 4 captured at t+6 and t+7. Then, as shown in the lower part of FIG. 4, the first to third tracking failed frames are recovered, and eventually the location information of the object of interest at t+2, t+6, t+7 on the frame is acquired.

The tube of the object of interest further including the corrected frame is generated in various ways.

In some embodiments, after acquiring the tracked frame and the tracking failed frame by tracking the object of interest on the source video and correcting at least part of the tracking failed frame, the tube of the object of interest may be generated (for example, by arranging in a time series manner) based on the tracked frame and the corrected frame.

In some other embodiments, after generating the tube of the object of interest based on the tracked frame, the generated tube of the object of interest may be reconstructed based on the tracked frame and the corrected frame.

Figure 6A:
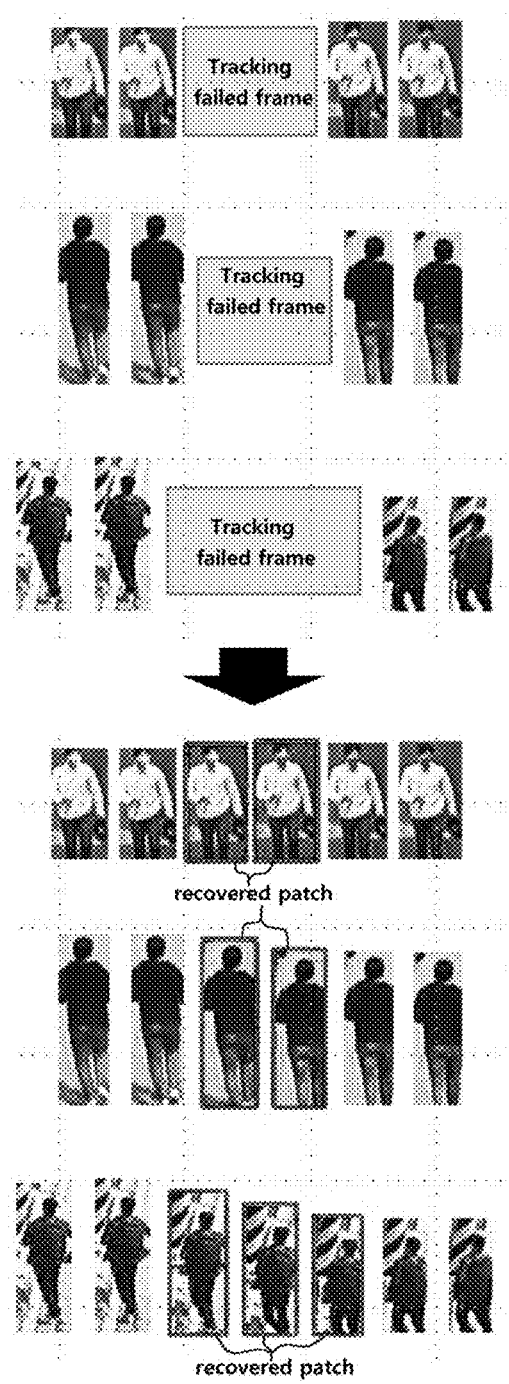
FIGS. 6A and 6B are diagrams showing the patch recovery result according to an embodiment of the present disclosure.
Figure 6B:
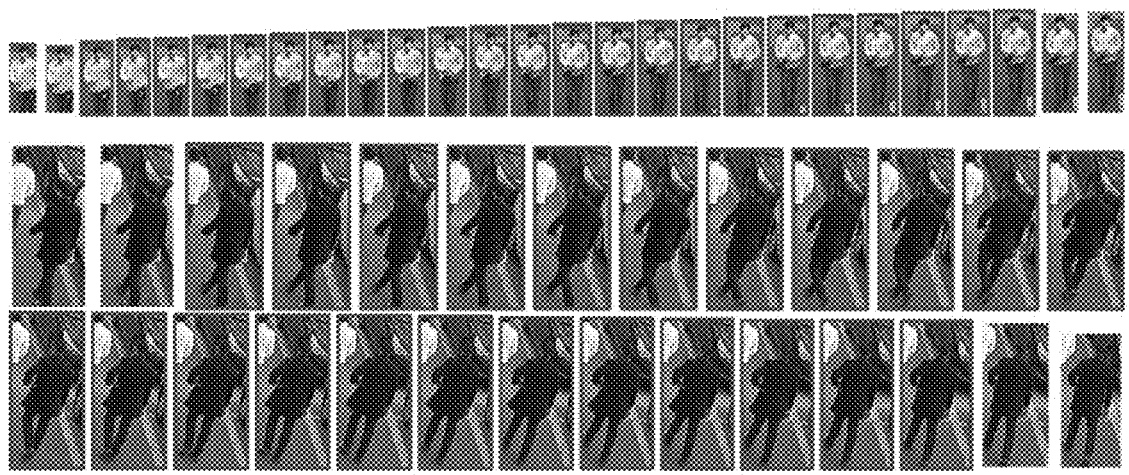

FIGS. 6A and 6B are diagrams showing the patch recovery result according to an embodiment of the present disclosure.

As shown in FIG. 6A, the tube of the object of interest is updated by replacing the tracking failed frame with the corrected frame in the corresponding tube (S150).

As shown in FIG. 6B, even when the tracked frame is smaller than the tracking failed frame and/or the tracking failed frame is a sequence of consecutive frames, location information of the object of interest on the tracking failed frame may be acquired by recovering the tracking failed frame. For a person wearing a white shirts of FIG. 6B, more than four patches including two patches of beginning part and two patches of last part and being outlined are restructured. For another person wearing a black suit of FIG. 6B, more than four patches including two patches of beginning part and two patches of last part and being outlined are restructured.

Through the steps S130 and S150, the server 10 acquires the frame (the tracked frame, or the tracked frame and the tracking failed frame) to be used to generate the tube of the object of interest, and generates the tube of the object of interest based on the frames (S150).

In an embodiment, the generated tube of the object of interest may be stored in the system 1 before receiving the image query related to the target object for which the user wants to search in the source video. However, the present disclosure is not limited thereto.

In another embodiment, the generation of the tube of the object of interest may be performed after receiving the image query related to the target object for which the user wants to search in the source video.

For efficient search, the server 10 may be further configured to perform an additional image processing operation related to the tube after the generation of the tube.

Additionally, the server 10 may unify some of the plurality of tubes of the object of interest generated in the step S130 according to the object of interest (S170). The server 10 unifies multiple tubes acquired from a single CCTV 30 or multiple CCTVs 30 through matching between tubes generated within a predetermined distance or a predetermined time based on the object. As the tube is used to search for the target object, if the tubes are not unified according to the object, the efficiency of search reduces.

The predetermined distance and/or the predetermined time refers to the spatial and temporal range in which the same object moving in the installation areas of the plurality of CCTVs 30 may be captured in overlapping views. The predetermined distance is the distance between the CCTVs 30, and the predetermined time is the generation time of the tube. The generation time of the tube relies on the start time and the end time of the tube.

The information associated with the predetermined distance and/or the predetermined time may be set to a specific value through the settings of the server 10, or may be set to local information in which the CCTV 30 having the predetermined distance and/or the predetermined time is installed.

In an embodiment, when $1^{st}$ to $n^{th}$ source videos in which the same object of interest X is seen in at least some frames are received from $1^{st}$ to $n^{th}$ CCTVs 30 installed in the same area respectively, n tubes of the object of interest including #1-1 tube of the object of interest and #1-n tube of the object of interest are generated by tracking the object of interest X in the $1^{st}$ to $n^{th}$ source videos, and the server 10 may unify the n tubes of the object of interest into the object of interest X (S170). In FIG. 3, different unified tubes do not represent a connected video. That is, juxtaposition of #1-1 tube and #1-2 tube of FIG. 3 does not indicate that #1-1 tube and #1-2 tube are played in that order. It represents that #1-1 tube and #1-2 tube are clustered into the same object of interest.

As shown in FIG. 3, etc., the plurality of CCTVs 30 is generally installed at the intersections such as three-way or four-way intersections or corners to capture at least part of the corresponding area in overlapping views. That is, the plurality of tubes of the same object may be generated within the predetermined distance and/or the predetermined time by the CCTVs 30 installed at the intersection or the corner.

The operation of unifying the n tubes of the object of interest (S170) is performed based on the whole or part (for example, the patch of the object of interest) of at least one frame included in each tube.

In an embodiment, the step S170 includes: selecting at least one representative image for each of the n tubes of the object of interest; and unifying the n tubes of the object of interest by clustering the tubes based on attribute information of the selected representative image.

The representative image is an image suitable to match the tubes generated from different CCTVs 30 through the object of interest, and may be a full or partial image of the individual frame of the tube. When the representative image is a full image of the individual frame of the tube, the representative image may be referred to as a representative frame.

In an embodiment, the representative image is a patch formed of at least part of a frame having a smallest direction change of the object of interest in the tube and/or a patch formed of at least part of a frame having a smallest speed change of the object of interest in the tube. After selecting the frame having a smallest change in each tube of the object of interest, the server 10 selects an image formed of at least part including the object of interest as the representative image (S170).

In another embodiment, the representative image is selected by calculating an image quality score for each of the plurality of patches in which the object of interest is seen in the plurality of frames included in the tube of the object of interest generated in the step S150. The image quality score is calculated based on the detection accuracy of the object of interest, the degree of occlusion of the object of interest, and the distance between the object of interest and the CCTV 30 having captured the object of interest.

As the event of the object of interest relies on the presence or absence of movement, in general, the object moves in the situation where the event occurs. Thus, blur may occur, and a detection error of the object of interest may occur (due to the pose).

The server 10 calculates the image quality score (for example, as a low score) to represent poor quality (for example, by giving a low weight) for a patch image having blur, occlusion and a long distance. To this end, the server 10 analyzes the image quality of the region of interest based on the detection accuracy of the object of interest, occlusion of the object of interest, and the distance between the object of interest and the imaging device.

As fewer parts of the object of interest are represented in the patch of the object of interest (for example, as fewer parts of the patch of the object of interest are hidden by an object and the pose), the detection accuracy is higher. Additionally, as the background included in the image of the object of interest is smaller, the detection accuracy is higher. That is, the server 10 is configured to have low detection accuracy when the patch of the object of interest includes a large background, or the patch of the object of interest includes many regions irrelevant to the object of interest, not including part of the object of interest. To this end, the server 10 analyzes the detection accuracy of the object of interest through a variety of image processing techniques that analyze foreground information and background information in the patch of the object of interest.

In an embodiment, the server 10 calculates the detection accuracy of the object of interest based on the dimensions of the object of interest included in the region of interest, a ratio of the background and the foreground in the region of interest, and the blur of the region of interest.

The server 10 calculates the dimensions of the object of interest included in the region of interest using a pre-learned detection accuracy model. The detection accuracy model may be a deep learning model having a CNN based network structure.

The detection accuracy model calculates a feature vector by extracting features from the image of the object of interest (for example, the patch of the object of interest), for example, using a training data set including a plurality of training samples, and scores the feature vector to classify the class of the object of interest in the image of the object of interest. The feature vector score corresponds to the dimensions of the object of interest included in the image of the object of interest. The scoring may be performed for each pixel or in a specific region including a plurality of pixels.

The dimensions of the object of interest included in the region of interest are calculated based on the feature vector score of the detection accuracy model. To this end, when the whole object of interest is included in the patch of the object of interest, the detection accuracy model has the feature vector score corresponding to high classification performance. On the contrary, when part of the object of interest is included in the patch of the object of interest, the detection accuracy model has the feature vector score corresponding to low classification performance.

In another embodiment, the server 10 separates the background and the foreground from the image in which the object of interest is detected, and calculates the ratio of the separated foreground area using the following Equation 3.

$$(W_{fg} \times W_{fg})/(W \times H) \quad \text{[Equation 3]}$$

Here, W, H denote the horizontal/vertical length of the entire area of the image (for example, the patch of the object of interest) in which the object of interest is detected, and $W_{fg}$, $H_{fg}$ denote the width/height of the foreground area.

When a plurality of objects is included as the foreground in the entire area of the image in which the object of interest is detected, the ratio of each object is calculated. In this instance, a variety of object detection techniques may be used to separate the background and the foreground. Here, the object corresponding to the foreground includes any object in which the user is interested, for example, a human, a vehicle, etc., and is not limited to a particular object.

Additionally, to analyze the detection accuracy, the server 10 may analyze whether the patch of the object of interest is clear or blurry.

In an embodiment, whether or how much the patch of the object of interest is clear may be analyzed through the wavelet or Laplacian technique. In another embodiment, the server 10 may analyze whether or how much the patch of the object of interest is clear by inputting the patch of the object of interest to a pre-learned image blur model.

The image blur model is a deep learning model having a CNN based network structure, and is learned using clear training images or blurry training images. How much the image of the object of interest is clear or blurry may be calculated based on the value based on the feature vector outputted from the CNN model.

As such, the server 10 may calculate the detection accuracy of the object of interest by analyzing the image in which at least part of the object of interest is seen in various aspects.

Additionally, the server 10 analyzes the degree of occlusion of the object of interest in the patch of the object of interest based on the local features in the image of the object of interest.

When the object of interest is fully detected without occlusion in the patch of the object of interest, the corresponding image has a low degree of occlusion. On the contrary, as more parts of the object of interest are not detected due to occlusion, the corresponding image has a higher degree of occlusion. Here, the definition high/low degrees of occlusion refers to opposite values that are not particularly defined.

In an example, when the object of interest is a human, the server 10 analyzes occlusion using skeleton information.

The server 10 calculates the distance between the object of interest in the image of the object of interest and the CCTV 30 based on depth information of the corresponding image. When the object of interest is at a long distance from the CCTV 30, the server 10 gives a low weight. In some embodiments, the long distance may rely on the resolution of the imaging device.

As such, the server 10 calculates a low rank image quality score for blur, occlusion and/or a long distance patch, and selects a patch having a high rank image quality score as the representative image. For example, a patch image having the highest image quality score may be selected as the representative image.

At least one image for a single tube may be selected as the representative image. For example, when a patch related to a direction change and a patch related to a speed change are different from each other, a plurality of representative images is selected.

Alternatively, after calculating the image quality score for each patch of the object of interest in the tube, the server 10 may compare it with a preset quality threshold β, and select an image having a higher image quality score than the quality threshold β as an image of interest.

The image having a higher image quality score than the quality threshold β refers to an image in which the object of interest can be identified due to less occlusion or blur in the image in which the object of interest is detected, and is an image worth substantially searching for. The image having a lower image quality score than the quality threshold β is an image in which the object of interest cannot be identified even though the image is found by searching and provided. The quality threshold β is set based on the statistical value that relies on the output specifications of the output device (for example, a display, etc.) or the specifications of the CCTV 30 of the user client that is provided with a search service.

In an alternative embodiment, the server 10 may be further configured to select the representative image based on the movement related change and/or the image quality score.

As such, after selecting the representative image for each tube of the object of interest, the server 10 clusters each selected representative image based on the attribute information of each representative image (S170). The server 10 is configured to perform a clustering operation based on the image processing information in the previous processes (for example, S130 and/or S150) and information (for example, the extracted features) used in the process of selecting the representative image.

In an embodiment, the attribute information of the representative image may include color information of the object of interest, blur information of the object of interest, specific motion information of the object of interest and/or behavior information of the object of interest. The color or specific shape may include, for example, clothes color, accessories (for example, bags, handbags, etc.) and hairstyle, but is not limited thereto.

The patch of the object of interest (for example, a human) may be classified for each attribute based on the attribute information to form a cluster, and further unification may be performed for each object.

In an embodiment, the server 10 is configured to correct the identifiers of at least some of the plurality of unified tubes into the same object to match the identifiers of the unified tubes through the unification operation.

Figure 7:
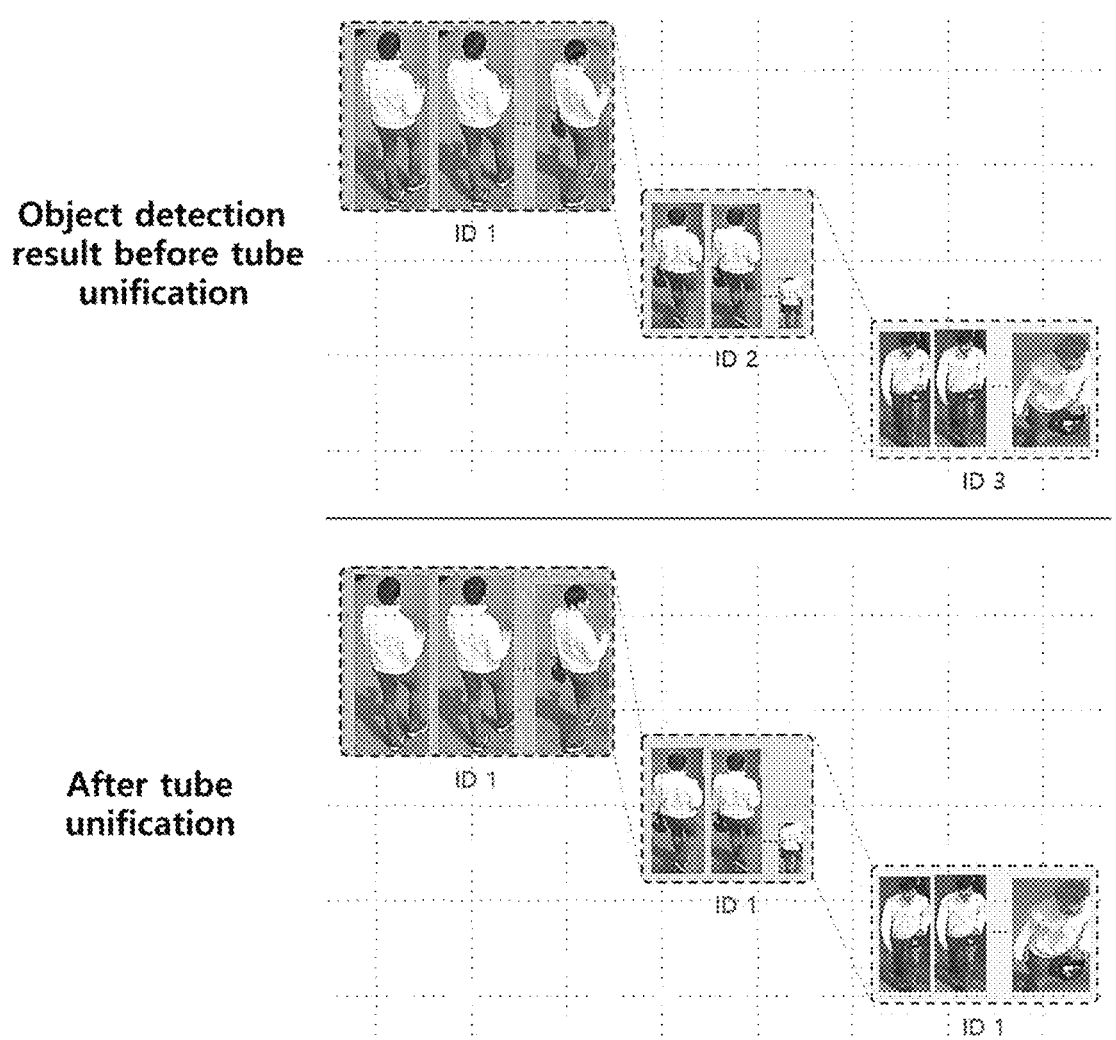
FIG. 7 is a diagram showing the unified result according to an embodiment of the present disclosure.

FIG. 7 is a diagram showing the unified result according to an embodiment of the present disclosure.

As shown in the upper part of FIG. 7, in the step S150, the server 10 acquires a plurality of tubes ID 1, ID 2, ID 3 of an object of interest related to a specific object A. That is, before unification, the tubes for the same object are identified as different ones. Through the unification operation, the tubes ID 1, ID 2, ID 3 are unified into the specific object A. As a result of unification, the identifiers of the tubes may be matched to have the same ID 1 as shown in the lower part of FIG. 7.

Additionally, the server 10 may calculate movement information of the object of interest from the tube of the object of interest (S190). Here, the movement information includes speed information and direction information of the object of interest being tracked.

In some embodiments, the server 10 may calculate the movement information of a specific unified object of interest based on at least part of the tube of the specific object of interest included in the same cluster (S190). For example, the server 10 is configured to calculate the movement information of the object of interest from each of a plurality of tubes (i.e., unified into the same object of interest) included in the same cluster, and finally calculate the movement information of the object of interest based on the movement information. Thus, it is possible to acquire less defective movement information of the object of interest than the movement information of the object of interest calculated based on a single tube from a single view.

The process of calculating the movement information of the object in the video including a sequence of consecutive frames is well known in the art, and its detailed description is omitted herein.

Additionally, when the server 10 generates the tube of the object of interest and performs the data processing operation related to the tube through the steps S150 to S190, the server 10 may further generate detailed information related to the corresponding tube, and associate the detailed information to the corresponding tube. The detailed information includes, but is not limited to, for example, the identifier of the tube, the movement information of the object of interest of the tube, the cluster attribute into which the tubes are unified, the cluster identifier, the representative image, and at least part of the detailed information of the source video used to generate the corresponding tube (for example, information of the CCTV 30).

When the server 10 receives a request for provision of information associated with a target patch that the user wants to search, the server 10 performs a re-identification operation to quickly search for the target object belonging to the object of interest based on the tube of the object of interest generated in the step S170 and/or the movement information of the object of interest calculated in the step S190 (S210 to S270).

In the step S210, the server 10 receives an image query including the target patch in which the target object is seen, and location information of the CCTV 30 having captured the target object. In an embodiment, the target patch may be a patch image extracted from the source video that captured the corresponding target object among the plurality of CCTVs 30. For example, the target patch is an image patch acquired from the source video that captured the target object for the first time or the last time when the image query is inputted to the server 10.

The server 10 re-identifies the target object in the tube of the object of interest to search for tube(s) of the object of interest that matches the target object (S250). Instead of performing the re-identification operation of the step S250 based on the entire area in which the CCTVs 30 are installed, the server 10 first estimates the search candidate area based on the speed and/or direction information in the unified tube of the object of interest (S230), and performs the re-identification operation based on the search candidate area (S250).

The server 10 determines at least one area as the search candidate area based on the direction and/or speed of the target patch (S230).

When the source video in which the target object is detected is acquired, the tube of the target object is also generated. It is because the target object corresponds to the object of interest having the event. Additionally, in case that a plurality of source videos captured the target object, the tubes of the target object may be unified.

The movement information including the speed information and/or the direction information of the target object is calculated based on the tube of the target object.

In an embodiment, the server 10 is further configured to calculate the movement information of the target object in the tube of the target patch from which the target patch is extracted; and when the extracted tube has a non-consecutive frame, search for a frame of the time corresponding to the non-consecutive frame in other unified tube, and additionally calculate the movement information of the target object at the corresponding time based on the frame found in other unified tube.

When the movement information of the target object is calculated, the server 10 determines at least one search candidate area based on the location information (for example, the local information, the installation coordinates, etc.) of the CCTV 30 of the system 1 in which the CCTV 30 is installed and the movement information of the target object. To this end, the system 1 is further configured to pre-store the location information of the CCTV 30 in the memory of the server 10 or a separate database.

In an embodiment, the server 10 is configured to determine, using the movement speed, at least one search candidate area as a first area in which the target object is likely to be captured when the movement speed decreases, a second area in which the target object is likely to be captured when the movement speed does not change, and a third area in which the target object is likely to be captured when the movement speed increases (S230).

Figure 8:
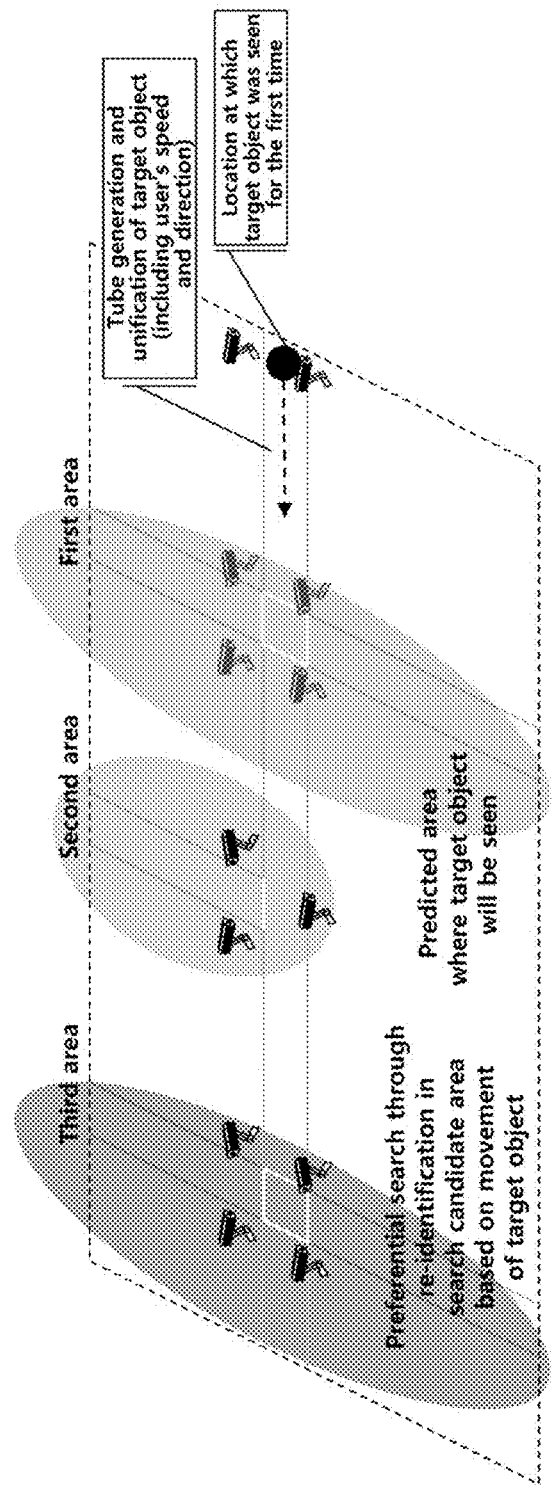
FIG. 8 is a conceptual diagram of a search candidate area according to an embodiment of the present disclosure.

FIG. 8 is a conceptual diagram of the search candidate area according to an embodiment of the present disclosure.

Referring to FIG. 8, fifteen CCTVs 30 are installed in four areas. When the target object is detected, the tube of the target object is generated by the server 10, and the movement information of the target object is acquired. Then, the server 10 determines the first to third areas of FIG. 8 as the search candidate area using the movement speed.

In another embodiment, the server 10 may variably set or predefine depending on the direction and speed.

Figure 9:
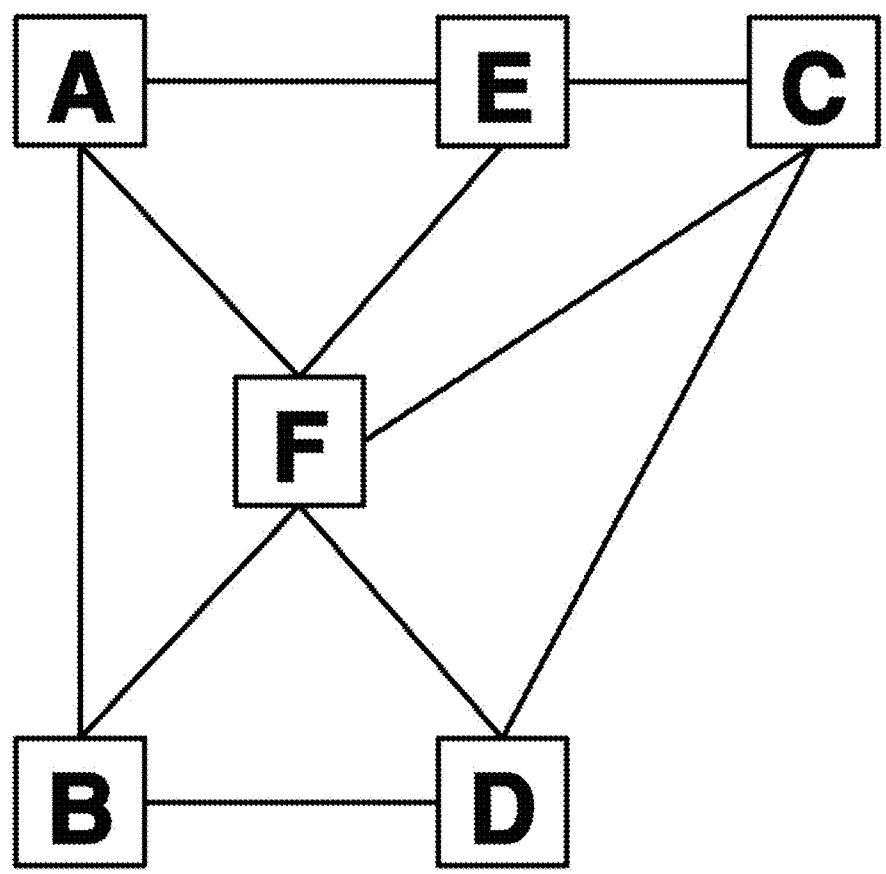
FIG. 9 is a diagram of a CCTV installation area according to an embodiment of the present disclosure.

FIG. 9 is a diagram of the CCTV installation area according to an embodiment of the present disclosure.

For example, when the locations of six CCTVs 30 are as shown in FIG. 9, the search candidate area may be determined by graphing each area using the physical distance. The determination of the search candidate area by graphing may be made by, for example, converting the camera 30 and the area in the form of a graph, and using a variety of algorithms, for example, the shortest path search algorithm such as the Dijkstra's algorithm, but is not limited thereto.

Then, to search for the tube of the object of interest in which the target object is seen, the server 10 re-identifies if the object of interest seen in at least one tube of the object of interest is the target object, by searching for a frame including a patch that matches the target patch in the plurality of frames included in the at least one tube of the object of interest (i.e., related to the corresponding search candidate area) generated by capturing at least part of the determined search candidate area (S250). That is, when the search candidate area is determined in the step S230, the server 10 searches for the same stored data cluster as the input image (or the clustering result of the input image), and re-identifies the target object in the same stored data cluster (S250).

In an embodiment, the step S250 includes: searching for a cluster that matches attribute information of the target patch at least in part; and re-identifying the target object in the tube of the object of interest included in the found cluster.

In the step S250, the server 10 may acquire feature result information of the tube by applying at least part of the frame included in the tube of the object of interest and at least part of the tube of the target object to a re-identification model; determining a matching tube based on comparison between the feature result information of the tubes; and searching for a cluster including the determined matching tube. In some embodiments, the representative image (or the representative frame) of the tube may be used for matching between tubes. To this end, the server 10 is further configured to select the representative image for each of at least one tube of the target object before matching.

Figure 10:
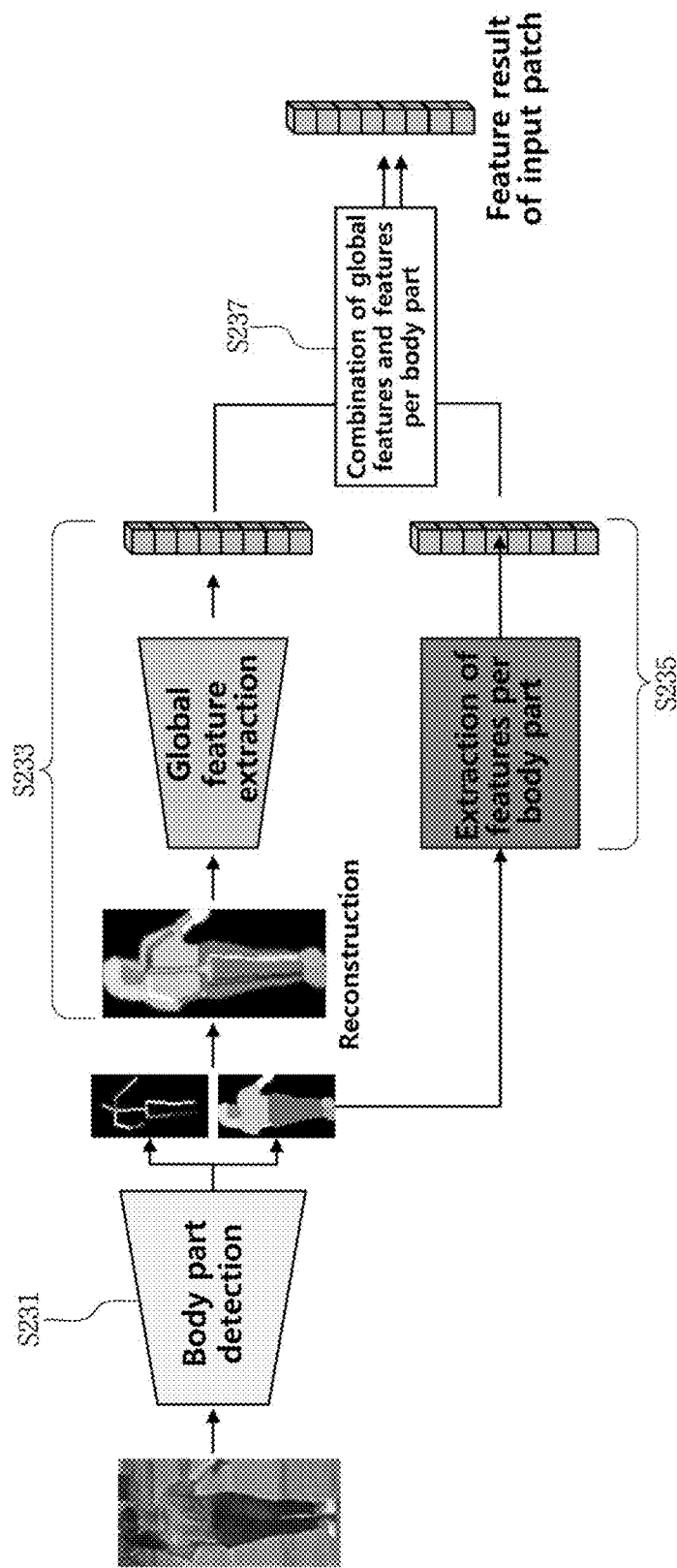
FIG. 10 is a conceptual diagram of a re-identification process according to an embodiment of the present disclosure.

FIG. 10 is a conceptual diagram of the re-identification process according to an embodiment of the present disclosure.

Although FIG. 10 is shown based on the case in which the class of the target object is a human, this is for illustration only, and it will be obvious to those skilled in the art that the re-identification operation of the present disclosure is not limited to the human.

Referring to FIG. 10, the re-identification model is a machine learning model having a CNN based network structure. In an embodiment, the re-identification model is configured to: when an image (for example, the representative frame) for matching is inputted, calculate skeleton information and body-part information by detecting body parts in the human image seen in the representative frame (for example, the target patch) of the target tube or the representative frame (for example, the patch of the object of interest) of the tube of the object of interest (S231); extract global features from reconstruction information (for example, a mask reconstructed image) of the skeleton and the body-part in combination (S233); extract features per part from each of the skeleton information and the body-part information (S235), and output feature result information of the tube by concatenating the global features and the features per part (S237).

In an example, the body part detection of the step S231 may be performed by a segmentation algorithm such as semantic segmentation and instance segmentation, but is not limited thereto.

When the target object is re-identified in the tube of the object of interest related to the search candidate area, the server 10 provides the user with the tube of the object of interest re-identified as the target object as a query result. The provided tube may be the whole or part of the unified tube.

When the target object is not re-identified in the search candidate area, the server 10 is further configured to perform re-identification in the remaining area not determined as the search candidate area.

The system 1 and method for re-identifying a target object based on location information of CCTV and movement information of the target object can achieve efficient search by unification of tubes of the same object even in consecutive multi-shot images.

As a result, it is possible to search for the target object, for example, a missing child quickly to ensure prompt initial action to be taken.

The operation of the system 1 and method for re-identifying a target object based on location information of CCTV and movement information of the target object according to the embodiments as described above may be, at least in part, implemented in a computer program and recorded in a computer-readable recording medium. For example, it may be implemented with a program product on the computer-readable medium including program code, and may be executed by the processor for performing any or all of the above-described steps, operations or processes.

The computer may be a computing device such as a desktop computer, a laptop computer, a notebook computer, a smart phone or like, and may be any integrated device. The computer is a device having at least one alternative and specialized processor, memory, storage, and networking component (either wireless or wired). The computer may run an operating system (OS) such as, for example, OS that is compatible with Microsoft Windows, Apple OS X or iOS, Linux distribution, or Google Android OS.

The computer-readable recording medium includes all types of record retrieval devices in which computer-readable data is stored. Examples of the computer-readable recording medium include read only memory (ROM), random access memory (RAM), compact disc read only memory (CD-ROM), magnetic tape, floppy disk, and optical data storage and retrieval devices. Additionally, the computer-readable recording medium is distributed over computer systems connected via a network, and may store and execute the computer-readable code in a distributed manner. Additionally, a functional program, code and a code segment for realizing this embodiment will be easily understood by persons having ordinary skill in the technical field to which this embodiment belongs.

While the present disclosure has been hereinabove described with reference to the embodiments shown in the drawings, this is provided by way of illustration and those skilled in the art will understand that various modifications and variations may be made thereto. However, it should be understood that such modifications fall within the scope of technical protection of the present disclosure. Accordingly, the true technical protection scope of the present disclosure should be defined by the technical spirit of the appended claims.

The invention claimed is:

1. A method for re-identifying a target object based on location information of closes-circuit television (CCTV) and movement information of the target object, performed by a computing device including a processor, the method comprising:
receiving a plurality of source videos captured in a plurality of areas, wherein the plurality of areas includes areas in which at least one of a plurality of CCTVs are installed;
detecting at least one object of interest in the plurality of source videos based on a preset condition of the object of interest;
tracking the detected at least one object of interest on the corresponding source video to generate, for each detected object of interest, a tube of the respective object of interest, wherein generating each tube comprises:
when $1^{st}$ to $n^{th}$ source videos, in which a same first object of interest is seen in at least some frames, are received from $1^{st}$ to $n^{th}$ CCTVs installed in a same area respectively, wherein n is an integer of two or greater;
tracking the first object of interest in the $1^{st}$ to $n^{th}$ source videos to generate n tubes of the object of interest including #1-1 tube of the object of interest and #1-n tube of the object of interest; and
unifying the n tubes of the object of interest into the first object of interest;
receiving an image query including a target patch in which a target object is seen, and location information of the CCTV having captured the target object;
determining at least one search candidate area based on the location information of the CCTV having captured the target object and the movement information of the target object;
re-identifying if the object of interest seen in the tube of the object of interest is the target object to search for the tube of the object of interest in which the target object is seen, wherein the tube of the object of interest, on which the re-identification is performed, is the tube generated by capturing at least part of the determined search candidate area; and
providing a user with the tube of the re-identified object of interest as a query result.

2. The method for re-identifying a target object based on location information of CCTV and movement information of the target object according to claim 1, wherein detecting the at least one object of interest comprises:
detecting an object satisfying the condition of the object of interest including at least one of an object condition or an event condition in the plurality of source videos; and
identifying the detected object as the object of interest,
wherein the object condition includes an object type, and the event condition includes presence or absence of movement of the object.

3. The method for re-identifying a target object based on location information of CCTV and movement information of the target object according to claim 1, wherein generating the tube of the at least one object of interest comprises:
arranging a tracked frame including a patch of the object of interest tracked in a single source video in a time series manner, to generate the tube of the identified object of interest from the corresponding source video.

4. The method for re-identifying a target object based on location information of CCTV and movement information of the target object according to claim 3, wherein generating the tube of the at least one object of interest further comprises:
when a tracking failed frame in which tracking of the object of interest failed in the corresponding source video is acquired, recovering the tracking failed frame based on a first tracked frame captured in an earlier time than the tracking failed frame and a second tracked frame captured in a later time than the tracking failed frame; and
further arranging the first tracked frame, the recovered tracking failed frame, and the second tracked frame in a time series manner to generate the tube of the object of interest.

5. The method for re-identifying a target object based on location information of CCTV and movement information of the target object according to claim 4, wherein recovering the tracking failed frame comprises acquiring location information of the object of interest for which tracking failed on the tracking failed frame,
the location information of the object of interest on the tracking failed frame, acquired through the recovery of the tracking failed frame, includes at least one of a horizontal coordinate-vertical coordinate pair of the patch of the object of interest to be tracked, or a height-width pair of the patch of the object of interest, and
when the tracking failed frame is captured at t, a previous tracked frame is captured at t+a, and a subsequent tracked frame is captured at t+b,
each of the horizontal coordinate ($x_t$) and the vertical coordinate ($y_t$) of the patch of the object of interest in the tracking failed frame is calculated by the following Equation:

$$x_t = |x_{t+b} - x_{t+a}|((t+b)-(t+a))$$

$$y_t = |y_{t+b} - y_{t+a}|/((t+b)-(t+a)) \quad \text{[Equation]}$$

each of the height ($h_t$) and the width ($w_t$) of the patch of the object of interest in the tracking failed frame is calculated by the following Equation:

$$w_t = w_{t+b} - w_{t+a}|((t+b)-(t+a))$$

$$h_t = |h_{t+b} - h_{t+a}|((t+b)-(t+a)) \quad \text{[Equation]}$$

where $x_{t+a}$, $y_{t+a}$, $w_{t+a}$, $h_{t+a}$ denote the horizontal coordinate, the vertical coordinate, the area and the depth of the patch of the object of interest tracked in the previous tracked frame respectively, and $x_{t+b}$, $y_{t+b}$, $w_{t+b}$, $h_{t+b}$ denote the horizontal coordinate, the vertical coordinate, the area and the depth of the patch of the object of interest tracked in the subsequent tracked frame respectively.

6. The method for re-identifying a target object based on location information of CCTV and movement information of the target object according to claim 1, wherein the unifying comprises:
selecting at least one representative image for each of the n tubes of the object of interest in each tube; and
unifying the n tubes of the object of interest by clustering the tubes based on attribute information of the selected representative image.

7. The method for re-identifying a target object based on location information of CCTV and movement information of the target object according to claim 6, wherein the representative image of the tube is a patch of at least part of a frame having a smallest change in direction of the object of interest in the tube or a patch of at least part of a frame having a smallest change in speed of the object of interest in the tube.

8. The method for re-identifying a target object based on location information of CCTV and movement information of the target object according to claim 6, wherein the representative image of the tube is selected by calculating an image quality score for each of a plurality of patches of the object of interest included in the tube, and the image quality score is calculated based on detection accuracy of the object of interest, a degree of occlusion of the object of interest, and a distance between the object of interest and the CCTV.

9. The method for re-identifying a target object based on location information of CCTV and movement information of the target object according to claim 1, wherein determining the search candidate area comprises determining at least one area as the search candidate area based on direction and speed of the target patch.

10. The method for re-identifying a target object based on location information of CCTV and movement information of the target object according to claim 9, wherein determining the search candidate area comprises determining the search candidate area by searching for a shortest path.

11. The method for re-identifying a target object based on location information of CCTV and movement information of the target object according to claim 6, further comprising:
before determining the search candidate area,
when the tube of the object of interest in from which the target patch is seen is unified with at least one additional tube, calculating the movement information of the target object from at least part of the at least one additional tube.

12. The method for re-identifying a target object based on location information of CCTV and movement information of the target object according to claim 11, wherein calculating the movement information of the target object from at least part of the at least one additional tube comprises:
calculating the movement information of the target object in the tube of the object of interest in which the target patch is seen; and
when the tube of the object of interest in which the target patch is seen has a non-consecutive frame, searching for a frame of a time corresponding to the non-consecutive frame in the at least one additional tube, and additionally calculating the movement information of the target object at the corresponding time based on the frame found in the at least one additional tube.

13. The method for re-identifying a target object based on location information of CCTV and movement information of the target object according to claim 1, wherein re-identifying if the object of interest seen in the tube of the object of interest is the target object comprises:
searching for a cluster that matches attribute information of the target patch at least in part; and
re-identifying the target object in the tube of the object of interest included in the found cluster.

14. The method for re-identifying a target object based on location information of CCTV and movement information of the target object according to claim 13, wherein searching for the matching cluster comprises:
acquiring feature result information of the tube by applying at least part of a frame included in the tube of the object of interest and at least part of the tube of the target object to a re-identification model;
determining a matching tube based on comparison between the feature result information of the tube; and
searching for the cluster including the determined matching tube.

15. The method for re-identifying a target object based on location information of CCTV and movement information of the target object according to claim 14, wherein a class of the target object is a human, and the re-identification model is configured to:
detect a body part in a human image seen in a target patch or a patch of the object of interest and calculate skeleton information and body-part information;
extract global features from reconstruction information of the skeleton and the body-part in combination; and
extract features per part from each of the skeleton information and the body-part information, and output the feature result information of the tube by concatenation of the global features and the features per part.

16. A non-transitory computer-readable recording medium having recorded thereon a computer program for performing the method for re-identifying a target object based on location information of closed-circuit television (CCTV) and movement information of the target object according to claim 1.

17. A system for re-identifying a target object based on location information of closed-circuit television (CCTV) and movement information of the target object, the system comprising:
a plurality of CCTVs to capture an object and a background, wherein the plurality of CCTVs is distributed in a plurality of areas and at least one CCTV is installed in each area; and
a server configured to perform an image processing operation, and in response to a user's request for provision of an image, provide the requested image, wherein the server is configured to:
receive a plurality of source videos captured in the plurality of areas from the plurality of CCTVs;
detect at least one object of interest in the plurality of source videos based on a preset condition of the object of interest;
track the detected at least one object of interest on the corresponding source video to generate, for each detected object of interest, a tube of the respective object of interest, wherein generating each tube comprises:
when $1^{st}$ to $n^{th}$ source videos, in which a same first object of interest is seen in at least one frame, are received from $1^{st}$ to $n^{th}$ CCTVs installed in a same area respectively, wherein n is an integer of two or greater;
tracking the first object of interest in the $1^{st}$ to $n^{th}$ source videos to generate n tubes of the first object of interest including #1-1 tube of the first object of interest and #1-n tube of the first object of interest; and
unifying the n tubes of the first object of interest;
receive an image query including a target patch in which a target object is seen, and location information of the CCTV having captured the target object, wherein the target patch comprises a patch image extracted from the respective source video of the CCTV having captured the target object;

determine at least one search candidate area based on the location information of the CCTV having captured the target object and the movement information of the target object;

re-identify if the object of interest seen in the tube of the object of interest is the target object to search for the tube of the object of interest in which the target object is seen, wherein the tube of the object of interest, on which the re-identification is performed, is the tube generated by capturing at least part of the determined search candidate area; and provide the user with the tube of the re-identified object of interest as a query result.

* * * * *